Sept. 26, 1967     J. E. ANDERSON     3,344,256

METHOD FOR PRODUCING ARCS

Filed Oct. 1, 1963

INVENTOR.
JOHN E. ANDERSON
BY
ATTORNEY

United States Patent Office 3,344,256
Patented Sept. 26, 1967

3,344,256
METHOD FOR PRODUCING ARCS
John E. Anderson, Indianapolis, Ind., assignor to Union Carbide Corporation, a corporation of New York
Filed Oct. 1, 1963, Ser. No. 312,905
2 Claims. (Cl. 219—121)

This invention relates to a method for producing arcs. More particularly, this invention relates to a method for producing arcs having controlled shapes.

Electric arcs have been used for many years for metal working processes such as, for example, welding and cutting. In processes such as these, it is oftentimes desirable to obtain arc columns having a particular arc shape most suited for the operation to be carried out. For example, low current arc columns that are very small in cross-sectional area are desirable for welding thin sheets of metal or for making narrow cuts. Also, when a seam weld is to be made, it is desirable to have an arc in the shape of a "ribbon" or "sheet" to increase weld speeds.

Accordingly, it is a main object of the invention to provide a process whereby an arc having the desirable characteristics may be produced.

Another object is to provide a process wherein the plasma generated by a first arc is used as an electrode for a second arc.

Still another object is to provide a process wherein arcs having very narrow cross-sectional areas may be produced.

A further object is to provide a process wherein a ribbon arc may be produced.

Figure 1:
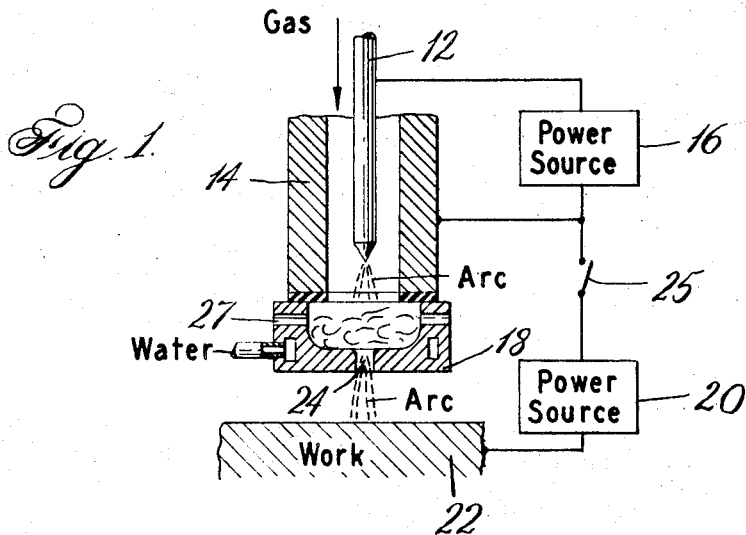
Figure 2:
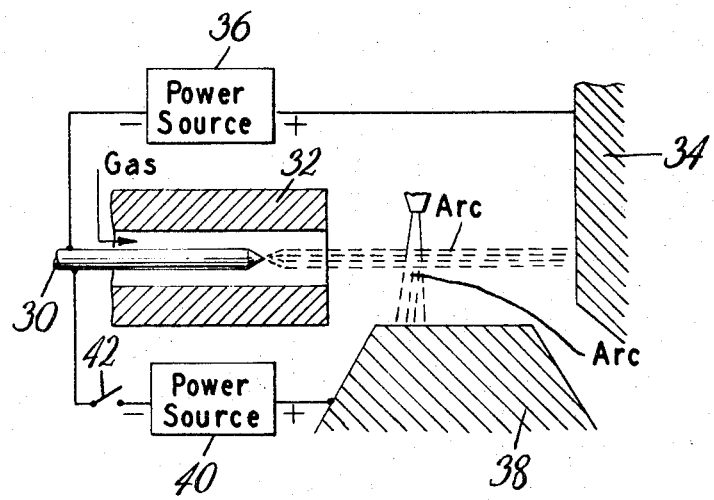

These and other objects will become apparent from the following description and drawings in which:

FIGURE 1 is a partial vertical cross-section view of typical apparatus for practicing one embodiment of the invention; and FIGURE 2 is a partial vertical cross-section view of another typical system in which the principles of the invention are carried out.

Referring to FIGURE 1, apparatus for carrying out the principles of the invention includes an electrode 12. A nozzle 14 surrounds electrode 12. A water-cooled plasma collecting chamber 18 is positioned downstream from nozzle 14 and is preferably although not necessarily insulated therefrom. Electrode 12 and nozzle 14 are in an electrical circuit including power source 16. A second power source 20 is connected to nozzle 14 and workpiece 22.

Suitable materials for the electrode 12 are those having good electrical emissivity such as tungsten or thoriated tungsten. Also the electrode 12 could be of an insert electrode of the type described in copending application Ser. No. 183,880 filed Mar. 30, 1962, now Patent No. 3,198,932, in the name of Merle Weatherly.

In operation, an arc gas compatible with the material of electrode 12 is passed down around such electrode and a first arc is struck between the electrode 12 and nozzle 14. The arc plasma is collected in chamber 18. A second arc is established through the orifice 24 in chamber 18 between the arc plasma of the first electrode and the workpiece 22 by closing switch 25. Excess plasma and pressure in chamber 18 is vented through passages 27 to the atmosphere. Since the plasma is one electrode for the second arc, centering of the arc within orifice 24 is not a problem. Thus, a small diameter passage can be used to produce a long narrow arc column.

In practice, the above embodiment has been most admirably suited for producing low amperage arcs. For example, when using argon as the arc gas and an orifice having a diameter of 0.013 inch, operation has been successful with 4 amperes at about 26 volts. For an orifice having a diameter of 0.020 inch, the maximum current was about 10 amperes. At current levels much above 10 amperes for a 0.020 inch diameter orifice, double arcing and erosion of the orifice occurs.

Various types of arc gases may be used compatible with the electrode, e.g. a reactive gas such as oxygen may be used with an insert electrode or conventional inert gases may be used with tungsten or thoriated tungsten. Further, while the invention is primarily directed at use of the arc plasma of a first arc as a cathode for a second arc, other polarities may be used as well as alternating current.

Since the cathode for the second arc is the plasma from the first arc, multiple second arcs can readily be achieved merely by drilling the desired number of holes in chamber 18. Such an arrangement would be especially useful for arc machining or scarfing, for example. Likewise, a single arc of a particular shape can readily be accomplished by forming the nozzle passage 24 into the shape desired.

As previously noted, chamber 18 need not be insulated from the nozzle 14. Under this condition, fluid cooling of the chamber 18 is critical in order to prevent the chamber 18 to act as a cathode.

The embodiment shown in FIGURE 2 is ideally suited for producing an arc sheet or ribbon. In this embodiment, an electrode 30 is surrounded by nozzle 32. Electrode 30 is connected to a first workpiece electrode 34 through power source 36. A first arc is established between electrode 30 and workpiece 34. An arc gas is passed into the arc to become at least part of the arc plasma flowing between electrode 30 and workpiece 34. A second workpiece 38 separate from workpiece 34 is connected in circuit relationship with electrode 30 through power source 40 and switch 42. A second ribbon arc is established between the plasma of the first arc and workpiece 38 by closing switch 42 when the workpiece is close to the plasma of the first arc.

The second arc in this embodiment is not limited in current. Currents as high as 200 amperes have been recorded in the second arc.

I have also found that the particular point where the second arc attaches to the electrode workpiece can be controlled by using auxiliary gas jets. I have done this by directing a gas jet against the arc column of the first arc of the embodiment shown in FIGURE 2. The same can be done for the second arc of the embodiment shown in FIGURE 1 by directing the gas jets against the second arc. When the jet is so directed at least a portion of the arc will be directed at the desired point on the workpiece. The shape of the directed arc will depend on the character of the auxiliary jet employed.

The following examples are presented as illustrations of the principles of the invention and, as an indication to those skilled in the art, of the manner in which to best practice the invention. The scope of the invention, however, is not to be construed as being limited by these examples.

*Example I*

In this example, apparatus of the type depicted in FIGURE 1 was used. A first arc was established between a ⅛ inch diameter, 1% thoriated tungsten cathode and a water cooled copper nozzle 14 having a 3/16 inch diameter outlet. Argon gas was passed down around the cathode through the nozzle into the chamber and out a passage .013 inch in diameter by 1/16 inch long. At an internal arc current of 110 amperes at 25 volts, the plasma extended through the nozzle orifice a distance of about 0.22 inch. An external arc was then initiated from the plasma in the chamber to an anode workpiece by applying an open circuit voltage from a welding generator. The internal arc was then varied between 105 and 110 amperes at from 25–27 volts, while the external arc varied from 3 to 4.44 amperes at from 32–54 volts.

*Example II*

In this example, apparatus of the type of FIGURE 1 was used, excepting in this case the .013 inch diameter nozzle orifice was replaced by a slit .020 inch wide and 11/32 inch long. An external arc that substantially filled the slit was maintained at currents up to 55 amperes at 50 volts.

*Example III*

In this example, apparatus of the general type depicted in FIGURE 1 was used. In this case, however, the electrode 12 consisted of a .125 inch diameter zirconia insert electrode of the type described in the aforementioned application Ser. No. 183,880. Also, instead of the single nozzle orifice, four 1/16 inch diameter holes were drilled. Argon gas at the rate of from 20 c.f.h. down to 10 c.f.h. was supplied as the arc gas. At the rate of 20 c.f.h., the internal arc ran at 200 amperes at about 16 volts. When the external arc circuit was closed, four arcs transferred from the plasma cathode to the anode workpiece at a total arc current of about 50 amperes at 28 volts.

The argon gas flow was then switched to oxygen. Using oxygen as the arc gas the internal arc current dropped to 185 amperes as the voltage increased to about 55 volts. Two external arcs transferred rather strongly to the anode workpiece from the plasma cathode, while the other two were somewhat weaker. The total arc current for the external arcs was about from 40–70 amperes at from 35–38 volts.

Thus it can be seen that the concept of this invention if not only applicable to multiple arcs, but that reactive gases as well as inert gases can be used.

*Example IV*

In this example, apparatus of the type depicted in FIGURE 2 was used. A first arc of about 200 amperes was established through a 1/4 inch diameter nozzle to a workpiece. The arc was about 1 1/4 inches long. A second arc was then established betwen the first arc and a 3/4 inch water cooled copper disk. The current for this arc varied from 100 amperes to 200 amperes. This second arc appeared to travel up and down the first arc forming an arc sheet.

What is claimed is:

1. A method for producing at least one arc which comprises establishing a first arc between a pair of electrodes, passing an arc gas into the established arc to form at least part of the arc plasma between said electrodes, striking at least one second arc between the arc plasma of the first arc as one electrode and a different workpiece electrode, directing at least one gas jet against said second arc to provide said second arc at a particular point on said different workpiece.

2. A method for producing at least one arc which comprises establishing a first arc between a pair of electrodes, passing an arc gas into the established arc to form at least part of the arc plasma between said electrodes, striking at least one second arc between the arc plasma of the first arc as one electrode and a different workpiece electrode, the axis of said second arc being at an angle with the plasma of said first arc, directing at least one gas jet against the arc plasma of the first arc to direct the second arc at a particular point on said different workpiece.

References Cited

UNITED STATES PATENTS 3,149,222  9/1964  Giannini et al.
3,153,133  10/1964  Ducati.

JOSEPH V. TRUHE, *Primary Examiner.*